United States Patent [19]
Nalle, Jr.

[11] 3,816,959
[45] June 18, 1974

[54] PLASTIC GUARD FOR PROTECTING YOUNG TREES, PLANTS, AND FLOWERS

[76] Inventor: George S. Nalle, Jr., 108 W. 2nd St., Austin, Tex. 78701

[22] Filed: Apr. 17, 1972

[21] Appl. No.: 244,443

[52] U.S. Cl............................. 47/23, 47/27, 47/31
[51] Int. Cl............................................. A01g 13/10
[58] Field of Search............ 47/26, 28, 31, 23, 27, 47/30, 45; 156/167; 264/167

[56] References Cited
UNITED STATES PATENTS

| | | | |
|---|---|---|---|
| 1,031,941 | 7/1912 | Lanham | 47/23 |
| 1,926,053 | 9/1933 | Morgan | 47/31 |
| 2,056,136 | 9/1936 | Hyatt | 47/23 |
| 2,297,729 | 10/1942 | Thomas | 47/30 UX |
| 2,601,326 | 6/1952 | Rohs et al. | 47/31 X |
| 2,753,662 | 7/1956 | Behnke | 47/31 X |
| 3,252,251 | 5/1966 | Simmons | 47/31 X |
| 3,373,525 | 3/1968 | Cavataid | 47/27 |
| 3,482,609 | 1/1969 | Neckerman | 47/31 X |

Primary Examiner—Robert E. Pulfrey
Assistant Examiner—R. T. Rader
Attorney, Agent, or Firm—Arnold, White & Durkee

[57] ABSTRACT

A one-piece extruder plastic guard for protecting young trees, plants, flowers, and the like includes a length of tubular mesh formed by intersecting thermoplastic filaments, the tubular mesh being bonded to an elongated thermoplastic extrudate defining a stake for anchoring the tubular mesh in the ground. The tubular mesh surrounds the plant to be protected while the stake portion of the one-piece structure holds the tubular mesh in a desired position.

3 Claims, 5 Drawing Figures

PATENTED JUN 18 1974 3,816,959
FIG. 1
FIG. 2
FIG. 3
FIG. 4
FIG. 5
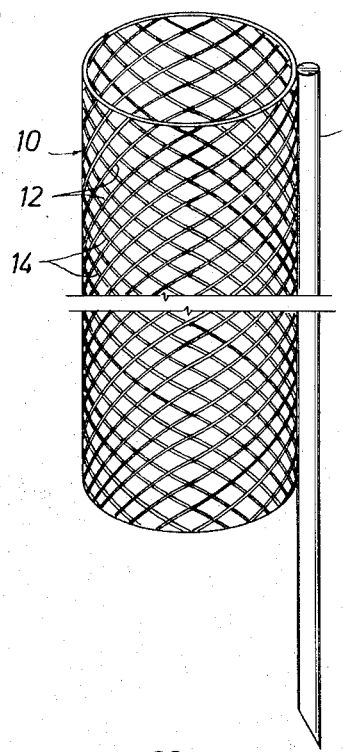
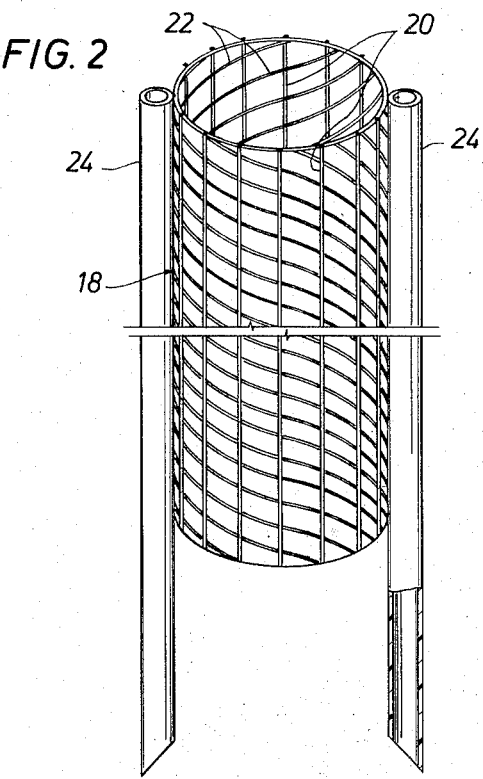
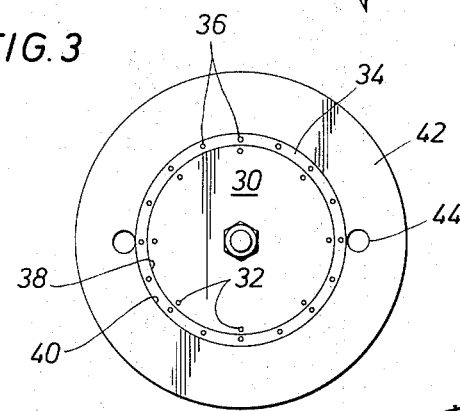
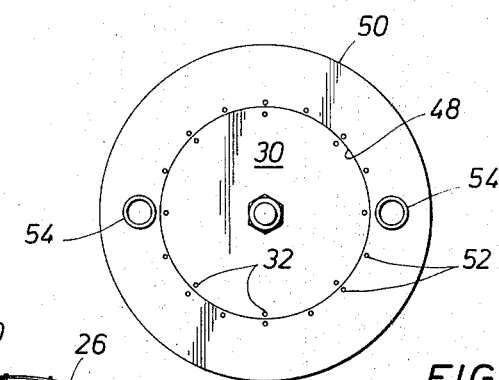
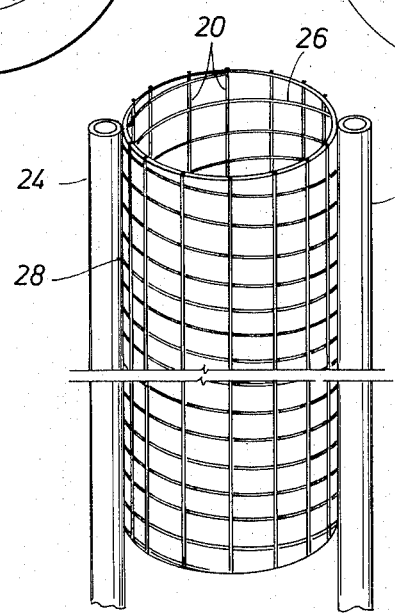

PLASTIC GUARD FOR PROTECTING YOUNG TREES, PLANTS, AND FLOWERS

BACKGROUND OF THE INVENTION

This invention relates to plastic products, and more specifically, to an extruded plastic guard for protecting young trees, plants, flowers, and the like, from animal damage.

Various prior art methods and apparatus are known for producing a tubular plastic mesh by extrusion of molten thermoplastics from relatively rotating dies. It is also known to produce a tubular plastic mesh in a plurality of colors or materials by providing separate melts of thermoplastic to selected of the dies. Exemplary of such prior art are my U.S. Pat. Nos. 3,067,084, and 3,118,180, respectively. The tubular mesh products resulting from such prior art methods are net-like in character and are produced by bonding two or more sets of generally parallel filaments extruded from relatively rotating dies at the intersections of such filaments.

The need for protecting young trees, plants, flowers, and the like from animal damage is well known. Each year countless thousands of young trees and other plants are killed or damaged by foraging animals. Rabbits, deer, elk, beavers, and porcupines, among others, will bite off the main leaders or nibble around the main stems of reproduction of young plants, killing or permanently injuring the plants. Such animals are particularly attracted to the more accessible and tender young plants and seedlings, even though abundant food is available from more mature, natural vegetation. This problem is especially acute in the forest products industry where reforestation is recognized as essential to meeting the rapidly rising demand for timber in future years. Trees and shrubs also play an important role in erosion control, as well as in providing scenery and wildlife food and shelter. Protection must be provided for the young trees and other plants if future needs for timber and ecological enhancement are to be met.

A number of protective devices have been tried in the past in an effort to protect young trees and the like from animal damage. For example, plastic coated paper and polyethylene sleeves or tubes have been placed over the trees or other plants, and held in place by being tied to stakes which have been placed in the ground along side the tubes. Paper coated plastic tubes are relatively expensive, however, and, like polyethylene sleeves, tend to block the natural flow of air around the plant. Wire screening has been used, and allows free air flow, but is also relatively expensive and, when it becomes bent over a young plant, often causes damage because the stiff wire does not tend to return to its original upright position. Various other mesh tubes and sleeves have also been tried, but none of these has been entirely satisfactory because of the labor necessary to place separate stakes in the ground along side the plants and to tie the tubes to the stakes to hold the tubes in the desired position.

SUMMARY OF THE INVENTION

The present invention provides an extruded tubular mesh plastic guard for protecting young trees, plants, flowers, and the like, including a section of tubular mesh formed by intersecting thermoplastic filaments, the tubular mesh being bonded to an extruded rod defining a stake for anchoring the mesh tube in the ground. The mesh tube surrounds the tree or other plant to be protected and permits natural circulation of air around the plant, while the stake is pressed or inserted into the ground to hold the mesh tube in place. The one-piece structure of the present invention eliminates any need for tying the tube to the stake.

In one aspect of the present invention, the mesh tube includes a first set of relatively stiff thermoplastic filaments parallel the tube axis, said filaments being intersected by and bonded to one or more relatively flexible thermoplastic filaments so that the tube will be relatively stiff in the upright or axial direction, while being radially collapsible for ease in packaging, shipping, handling, and storage.

In another aspect of a plant guard in accordance with the present invention, an extruded thermoplastic stake bonded to the mesh tube has a hollow bore therethrough for application of fertilizer, plant nutrients, and water to the roots of a plant.

Accordingly, it is an object of the present invention to provide a one-piece extruded plastic tubular mesh protector for young trees, plants, flowers, and the like, including a stake for securing the protector in the ground at the base of the plant.

It is another object of the present invention to provide a one-piece extruded plastic tubular mesh protective guard for young trees, plants, flowers, and the like which may be inexpensively produced and utilized to protect such plants from animal damage.

Still another object of the present invention is the provision of a one-piece extruded plastic tubular mesh protective guard for young trees, plants, flowers, and the like, including a stake member having therein provision for root feeding of fertilizer and plant nutrients, and for root watering of such trees, plants, flowers, and the like.

Among the further objects of the present invention is the provision of an extruded tubular plastic mesh protective guard for young trees, plants, flowers, and the like, including a stake member extruded parallel the tube axis, and which readily may be flattened for packing, shipping, storage, and handling.

Another object of the present invention is to provide a tubular plastic mesh guard for protection of young trees, plants, flowers, and the like, including a plastic mesh tubular body which is relatively stiff in the axial direction and flexible in the radial direction so as to be readily collapsible for flat packing.

Among the still further objects of the present invention is the provision of an extruded plastic mesh protective guard for young trees, plants, flowers, and the like, including a plurality of extruded plastic stakes for anchoring the guard in a desired position.

The foregoing objects, as well as others which will be apparent, are achieved by the present invention wherein a section of tubular plastic mesh is bonded to an extruded, relatively rigid rod defining a stake for anchoring the mesh tube in the ground around a young tree, plant, flower, or the like to be protected. Protective guards in accordance with the present invention may be made from one or more melts of thermoplastic by simultaneously extruding and bonding together a tubular plastic mesh and a relatively rigid rod, typically of greater cross-section than the mesh, and periodically removing a section of mesh from the rod to leave that portion of a stake defined by the rod which may be forced into the ground to secure the tubular mesh around the young tree or other plant being protected. Alternatively, the stake may be extruded as a hollow rod to permit its use in root feeding or watering of the young tree or other plant being protected.

BRIEF DESCRIPTION OF THE DRAWINGS

FIG. 1 is a perspective view of one embodiment of a plastic guard for protecting young trees, plants, and flowers in accordance with the present invention.

FIG. 2 is a partially sectioned perspective view of another embodiment of a plastic guard for protecting young trees, plants, and flowers in accordance with the present invention, including a hollow stake for root feeding.

FIGS. 3 and 4 are plan views of die heads through which the tubular mesh guard of FIGS. 1 and 2, respectively, may suitably be extruded from one or more melts of thermoplastic.

FIG. 5 is a perspective view of still another embodiment of the present invention.

DESCRIPTION OF PREFERRED EMBODIMENTS

Referring now to FIG. 1, reference numeral 10 identifies a section of tubular plastic mesh comprising sets 12 and 14 of parallel thermoplastic filaments bonded to one another at their intersections. A relatively rigid rod or stake 16 runs parallel to the axis of the mesh section 10 and is bonded to the mesh at its intersections with filaments 12 and 14. Stake 16 extends below the bottom of mesh section 10 for pushing into the ground to anchor the mesh section in place around the young tree or other plant being protected. Note that the lower end of stake 16 terminates in a diagonal to facilitate its insertion into the ground.

It will be understood that the term "filament" is used herein with reference to extruded plastic filamentous products having any cross-sectional shape which may be, for example, circular, triangular, rectangular, ribbon-like, ellipsoidal, or the like. The formation of filaments having such various cross sections is well known in the art.

The term "thermoplastic" as used herein refers to materials capable of melt or compression extrusion in a molten state through dies and settable by cooling on issuance from the dies. Suitable thermoplastic materials include polyethylene, polypropylene, polyamides, such as nylon, polyesters, polyvinylchlorides, or other vinyl polymers or copolymers, acrylic polymers or copolymers, other polyolefins, cellulosic materials, such as cellulose acetate, natural or synthetic rubbers and rubber-like materials, and other materials with like properties. The combination of various thermoplastic materials having different rigidities will be discussed hereinafter.

The term "bonded" as used herein refers to the contact together of two or more thermoplastic filaments or members within a relatively short time after extrusion while such filaments or members are still relatively soft and tacky, such that on contact an integral joint is formed between such elements. The term "welding" may also sometimes be used hereinafter in reference to such integral joints.

Referring now to FIG. 2, an alternate embodiment of a plastic mesh protective guard in accordance with the present invention is shown. In this embodiment, a section of tubular mesh 18 includes a first set of parallel thermoplastic elements 20 parallel to the axis of the tube and a second set 22 of parallel thermoplastic filaments intersecting and bonded to the filaments of the first set. Two relatively rigid rods 24 run the length of tube 18 parallel to the axis of the tube and extend below the bottom of the tube to define stakes for securing the tube in the ground around the young tree or other plant to be protected. In this embodiment, stakes 24 have a central bore, so that when they are pushed into the ground they may be used for root feeding or root watering of the protected plant.

The plastic tubular mesh protective guards of this invention may be of various sizes, depending on the type of tree or other plant for which protection is sought. For example, the tubular mesh may be as small as 2 or 3 inches in diameter and 6 inches or less in height with the stake extending 1 or 2 inches below the bottom of the mesh. In other applications, such as, for example, protection of young trees, the tubular mesh may be 2 inches more or less in diameter and 15 to 30 inches or more in length, having a stake extending 3 to 6 inches more or less below the bottom of the mesh for suitably anchoring the protective guard in the ground around the tree being protected.

As has been previously noted, protective guards in accordance with the present invention may include a plurality of stakes, one or more of which may be of axially hollow configuration to permit root feeding or watering. For example, a number of stakes may be bonded to the tubular mesh section at equally or unevenly spaced distances around its periphery.

Typically, the stakes which are bonded to the tubular mesh sections in accordance with the present invention are formed of a relatively rigid thermoplastic, for example, polypropylene, so that the stakes may be readily pushed into the ground to secure the mesh in the desired location.

It will be appreciated that protective guards in accordance with the present invention may be more easily packed, shipped, stored, and handled if the tubular mesh sections thereof may be radially flattened to produce a flat package. This may be accomplished by, for example, making the mesh strands 12 and 14 of FIG. 1 of low density polyethylene or other relatively flexible thermoplastic.

The embodiment of the present invention illustrated in FIG. 2 is particularly adapted to be made relatively rigid in the axial direction while still easily flattened radially as discussed above. This may be accomplished by making filaments 20 of a relatively rigid thermoplastic material such as, for example, polypropylene, and making filaments 22 of a relatively flexible thermoplastic material such as, for example, low density polyethylene. It will be appreciated that such a protective guard might be produced with one or more stakes bonded thereto, any number of the stakes being of either hollow or solid configuration. The use of relatively rigid thermoplastic material for those filaments parallel the axis of the mesh tube is particularly advantageous in producing relatively long protective guards in accordance with the present invention wherein structural rigidity may be achieved for protection of the plants while maintaining easy radial flattening.

With reference now to FIG. 3 of the drawings, a die head is illustrated which is suitable for producing a plastic guard in accordance with the embodiment of FIG. 1. The die head includes inner and middle rotating dies 30 and 34, respectively, and outer non-rotating die 42. The inner and middle dies define miter line 38 therebetween, while the middle and outer dies similarly define miter line 40. Means are provided above the die head for continuously supplying molten thermoplastic under pressure to extrusion opening 44. Similarly, means are provided to continuously provide molten thermoplastic under pressure to a plurality of extrusion openings 32 and 36 in the two rotating dies.

The plastic mesh 10 of FIG. 1 may be produced by extruding molten thermoplastic through counterrotating dies 30 and 34. Rod or stake 16 is continuously extruded through opening 44 in die 42, and is bonded to the intersecting filaments of the mesh. The size of the tubular mesh and of the stake will be determined in large part by the size of the corresponding die circle and orifices, although the dimensions of the tubular mesh may be increased or decreased by drawing over a suitable mandrel as is well known in the art. The product issuing from the die head of FIG. 3 will be a continuous length of mesh having an elongated thermoplastic extrudate bonded along one side thereof. The mesh may be periodically cut away or otherwise removed from the elongated extrudate to produce plastic guards in accordance with the present invention as illustrated in FIG. 1.

Referring now to FIG. 4, a die head assembly for extruding a plastic guard for protection of young trees, plants, flowers, and the like in accordance with the embodiment of the present invention illustrated by FIG. 2, includes an inner rotating die 30 and an outer non-rotating die 50. Molten thermoplastic is provided to the orifices of this die head similarly as to those of FIG. 3. Dies 30 and 50 define miter line 48 between them. Orifices 52 of die 50 produce filaments corresponding to filaments 20 of FIG. 2, and orifices 32 of die 30 produce filaments corresponding to filaments 22 of FIG. 2. An elongated hollow extrudate is extruded from orifices 54, and corresponds to rods or stakes 24 of FIG. 2. Plastic guards in accordance with the embodiment of FIG. 2 may be produced by suitably cutting away sections of mesh material from the continuous stream produced from the die of FIG. 4.

It will be readily appreciated that by using a die head similar to that illustrated in FIG. 4, but having a single opening 32 in the inner rotating die, a product similar to that illustrated in FIG. 2 may be produced. Such a product is illustrated in FIG. 5, and comprises axial filaments 20 and stakes 24 as illustrated as in FIG. 2 together with a single spiral inner filament 26 intersecting and bonded to filaments 20 and stakes 24 to define a tubular mesh 28.

Means for supplying separate melts of thermoplastic to the various dies 30, 34, and 42 of FIG. 3 or 30 and 50 of FIG. 4 are well known in the art. Similarly, orifices 52 and 54 of die 50 might be supplied from separate melts of thermoplastic. In this manner, plastic guards in accordance with the present invention may be extruded from one or more colors or compositions of thermoplastic, as discussed above.

In use, plastic guards in accordance with the present invention are placed with the plastic mesh segment surrounding the tree or other plant to be protected and the lower end of the rod is pushed or inserted into the soil to anchor the mesh portion of the guard in the desired position. It will be appreciated that the preferred dimensions of the mesh and the stake may vary depending on the diameter and height of the tree or plant to be protected. Similarly, the size of the mesh openings may also vary. Tubular mesh diameters of from about 1 inch to about 6 inches and lengths of from about 3 inches to about 24 inches are suitable for protecting most trees and plants. In this range of overall sizes, a mesh opening defined by intersecting filaments on 1/4 inch centers is suitable. It will be appreciated, of course, that greater or lesser mesh segment diameters or lengths will be appropriate for the protection of some trees, plants, flowers, and the like. Similarly, smaller or greater mesh openings may be desirable in particular applications.

When the stake portion of the plastic guard is a solid rod, a rod having a circular cross-section of 1/4 inch diameter or more is suitable. It will be appreciated that the size of the stake and the material of which it is made will affect the ease with which it may be inserted into the ground to hold the mesh portion of the protective guard in the desired position. The greater the inherent rigidity of the stake material, the lesser need be the cross-section of the stake to provide a sufficiently rigid stake for readily pushing into the ground. Similar considerations will apply to the hollow stakes which may be used for root feeding or watering, and which will generally be of greater overall diameter to permit flow of fertilizer, plant food, or water through the bore thereof. Appropriate fittings may be attached to the upper ends of such stakes for connection to hoses and the like, both as an aid to inserting the stake into the ground and in root feeding or watering.

While the invention has been described with reference to particular embodiments, it will be understood that this description is not meant to be construed in a limiting sense. Various modifications of the disclosed invention, such as, for example, variations in dimensions or filament configurations of the mesh or use of a plurality of stakes, will be apparent to persons skilled in the art upon reference to this description. It is therefore contemplated that the appended claims will cover any such modification or embodiments as fall within the true scope of this invention.

What is claimed is:

1. An extruded plastic guard for protection of young trees, plants, flowers, and the like, comprising:
   first and second sets of parallel thermoplastic filaments intersecting and bonded to one another at said intersections to define a segment of tubular mesh having a longitudinal axis, the filaments of said first set being parallel to said axis and substantially rigid with respect to the filaments of said second set to provide a longitudinally rigid structure adapted to be easily flattened in a dimension normal to said axis; and
   an elongated thermoplastic extrusion parallel to said axis and bonded to the tubular mesh, said extrusion extending from one end of the tubular mesh to define a stake for anchoring the guard at a desired location.

2. An extruded plastic guard as recited in claim 1, including a plurality of said elongated extrusions to define a corresponding number of stakes at spaced locations about the periphery of said tubular mesh segment.

3. An extruded plastic mesh guard for protection of young trees, plants, flowers, and the like, comprising:

a set of first parallel thermoplastic filaments intersecting and bonded to a second, spirally disposed flexible thermoplastic filament to define a segment of tubular mesh having a longitudinal axis, said first filaments being parallel to said axis and substantially rigid with respect to the second filament to provide a longitudinally rigid structure adapted to be easily flattened in a dimension normal to said axis; and an elongated thermoplastic extrusion parallel to said axis and bonded to the tubular mesh, said extrusion extending from one end of the tubular mesh to define a stake for anchoring the guard at a desired location.

* * * * *